May 4, 1926.

G. K. DAVOL 1,583,672

REGULATOR FOR INTERNAL COMBUSTION ENGINES

Filed August 26, 1921     2 Sheets-Sheet 1

Patented May 4, 1926.

BEST AVAILABLE COPY 1,583,672

UNITED STATES PATENT OFFICE.

GEORGE K. DAVOL, OF SAN FRANCISCO, CALIFORNIA, ASSIGNOR TO CHARLES A. BROWN, OF HINSDALE, ILLINOIS.

REGULATOR FOR INTERNAL-COMBUSTION ENGINES.

Application filed August 26, 1921. Serial No. 495,477.

*To all whom it may concern:*

Be it known that I, GEORGE K. DAVOL, a citizen of the United States, residing at San Francisco, in the county of San Francisco and State of California, have invented a certain new and useful Improvement in Regulators for Internal-Combustion Engines, of which the following is a full, clear, concise, and exact description, reference being had to the accompanying drawings, forming a part of this specification.

This invention has particular application to engines in the operation of which the supply of air is restricted at partial loads, or in which at partial loads the cylinder charge of air is at less than atmospheric density.

In such engines it is desirable to provide a certain definitely variable ratio of quantity of air to quantity of fuel, to form the mixture or charge compressed within the cylinder, to suit various loads and conditions of operation. Thus, for light or partial loads, when the supply of air is restricted or throttled, the supply of fuel must also be restricted or cut down, but not always to the same extent.

It is usually found advantageous in the operation of such engines at partial load, when the air supply is throttled or restricted, to employ a richer mixture, or a reduced ratio of air to fuel than when operating at full load with an unrestricted supply of air. The most advantageous ratio of air to fuel cannot be fixed, even for any given restriction of air supply or degree of density of the air drawn into the cylinder, but for most desirable results this ratio should also be varied to suit the character of the fuel used, the relative temporary importance of power output and economy of fuel, and to suit starting conditions and other considerations.

Figure 1:
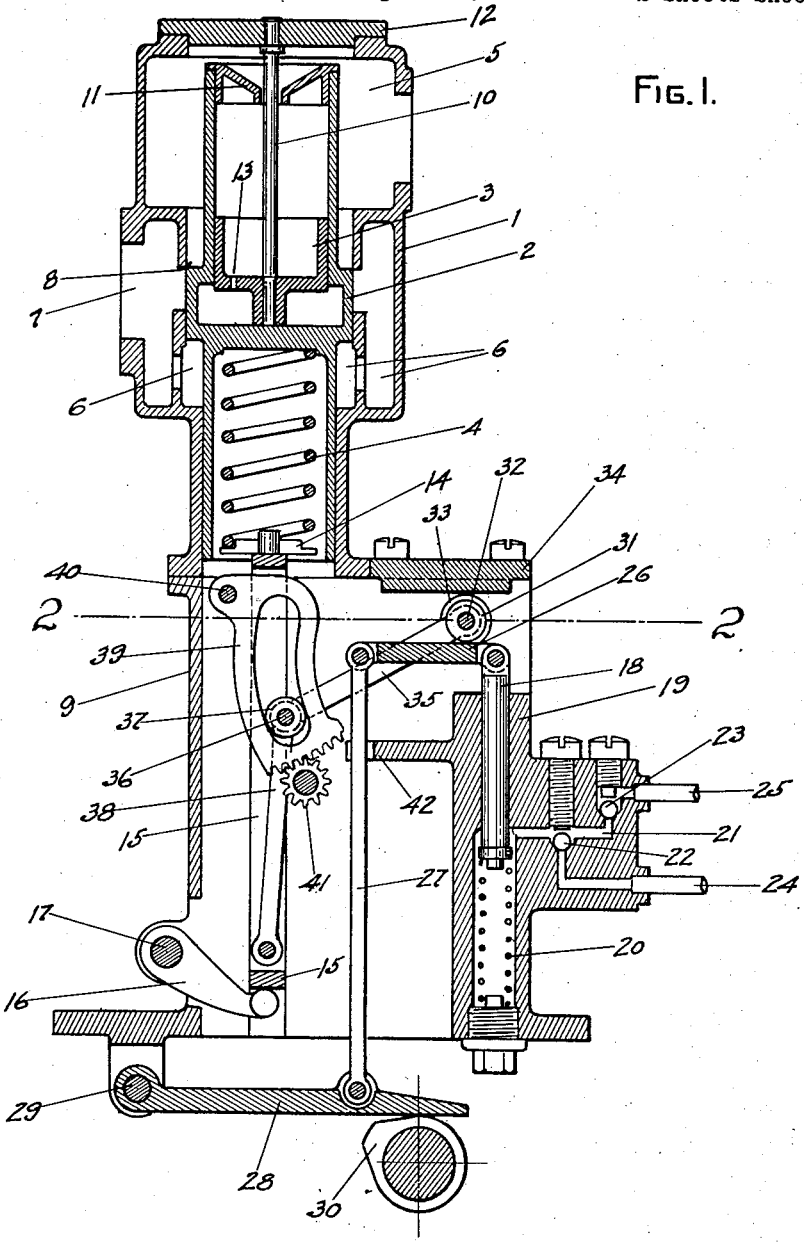
Figure 1 is a sectional view taken through the center of one form of the device.

In the form of apparatus embodying my invention I have shown in the drawings, the supply of air to the engine passing through the apparatus can be throttled or restricted, through the action of a piston, against one side of which the atmospheric pressure of the incoming air bears, while its opposite side is open to the pressures existing within the intake pipe or manifold of the engine. Assisting the intake pressure against the back of the piston, the force exerted by a spring is applied, and this spring force is variable by hand or external operation or adjustment. For air to enter the intake of the engine it is therefore necessary for its pressure to more than balance the intake pressure in addition to what pressure may be exerted on the piston by the hand adjusted spring.

In the device as illustrated the force of this throttling spring on the piston is regulated by a part bearing against it and forcing it in turn against the piston. This part is operated or adjusted by hand or other external means, and for any setting of this part a certain definite spring force is exerted on the piston and it follows that a certain definite air pressure must exist within the intake of the engine when it is running. The movements of this spring pressure adjusting part, which as explained must correspond to definite variations of pressure or density of air within the engine intake, are communicated to a suitable device for supplying fuel to the engine, in a manner to suitably regulate or vary its delivery of fuel by the device or pump to the engine. In this manner by so simultaneously controlling the supply of air and fuel to the engine definite ratios between them can be maintained.

It is essential that any given movement supplied by hand or other external means be communicated to the air controlling portion of the apparatus and to the fuel supplying portion of the apparatus in such a manner that the following conditions be complied with:

(*a*) For any degree of density of air within the intake of the engine, a certain determinate quantity of fuel must be supplied per engine cycle, for any setting or adjustment of the apparatus; according to some determinate law or rule of variation, which may be most easily expressed graphically by a curve.

(*b*) This determinate rule according to which the proportion of fuel to air is governed (either varied or maintained constant) with varying degrees of density of air drawn into the engine cylinder, must also be subject to variation, to suit variations in character of fuel, and starting and other conditions.

The essence of my invention lies in the portion of the apparatus, as herein described, and shown in the accompanying drawings, whereby any movement or setting of the air controlling portion of the apparatus, resulting in a definite variation of intake pressures, causes movements to be communicated to the means for varying the fuel delivery of the fuel supplying portion of the apparatus, in a manner to fill the required conditions just set forth.

With the fuel supplying portion of such complete apparatus my invention is less essentially concerned, and it is only required that any form of workable device or pump be supplied, capable of having its quantity of delivery varied in some preferably positive manner, as for example through the variation of the stroke of the plunger of a pump.

Figures 2, 3:
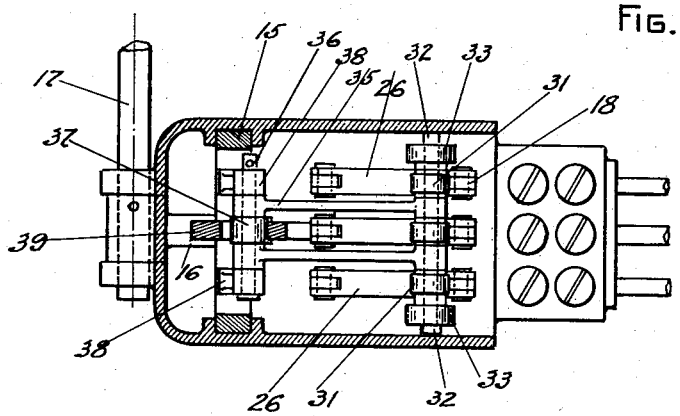
Figure 2 is a sectional view taken at right angles to and on the line 2—2 of Figure 1.
Figure 3 shows a diagram giving curves of ratios of air and fuel for various degrees of density of air drawn into the cylinder of an engine, which curves can be followed in the operation of the apparatus.

Referring to the accompanying drawings, and first to Figure 3, I here show a diagram giving four curves, each curve representing a certain rule of variation of the ratio of air to fuel with varying degrees of intake pressure. In the diagram the ratios of air to fuel are shown to increase with the vertical height above the base, while the intake pressures are set off horizontally. The curve marked A shows the manner in which the ratio of air to fuel may be desired to vary with varying air densities within the engine intake, for certain fuels, for economical operation. The curve marked B gives a larger proportion of fuel to the charge for all air densities. The curve C gives a still greater proportion of fuel to air, or a richer mixture for all air densities and may be adapted for conditions at starting the engine, or for a maximum output of power with certain fuels. Curve D gives still further enrichment of fuel to the mixture of fuel and air. These four curves, which may be taken as typical examples of conditions of mixture which may be desirable under certain conditions of operation, can all be followed, as well as an indefinite number of similar curves, by the form of apparatus I herein describe and illustrate, and which is one embodiment of my invention.

Referring to Figure 1, the upper portion of the apparatus shown, constitutes the air controlling portion and comprises essentially a body 1, a double piston 2, a dash pot or cataract piston 3 and a spring 4. The body 1 is bored cylindrically with two diameters, the large diameter of the piston 2 fitting and moving within the larger bore and its smaller or lower end fitting the smaller bore of the body. The body 1 is divided as shown into two main chambers, an upper chamber 5 open to the atmosphere and a lower chamber 6 communicating through the orifice 7 with the engine intake. These two chambers are in communication with each other only through the annular port 8 which can be closed and in the position of parts shown in the drawing, is closed by the large part of the piston 2. The body 1 is secured to the box 9 below, which is open to the atmosphere.

It will be seen that the smaller diameter of the piston 2 is open on both sides to the atmospheric pressure, while the annular area constituting the difference in area of the large and small diameters of the piston, is open on its upper side to the pressure of the atmosphere, while its lower side is only open to the pressures within the chamber 6 which correspond to those existing within the engine intake. The spring 4 bearing at its upper end against the under side of the piston 1 has its lower end bearing on a cap 14, the position of which is variable as hereinafter described.

The upper end of the double piston 2 is bored out to form a dash pot cylinder or cataract cylinder, properly fitted within which the cataract piston 3 is held stationary by the rod 10 passing through the splash cover 11 and attached to the body cover 12, which closes tightly the upper end of the body 1. This cataract piston 3 has a projection on its lower face, which in the position of the parts shown in the drawing, is in contact with the piston 2 and forms a stop limiting the upward travel of the piston 1. The cataract piston 3 has a hole 13 in it through which oil or liquid within the cataract cylinder is forced back and forth with any movement of the piston 1. This cataract cylinder and piston simply forms a practical feature of design acting to damp or check too rapid movements of the piston 1.

It will now be seen that any depression of pressure or density of the air within the engine intake and consequently within the chamber 6 acting on the lower face of the annular or differential area of the double piston 1 will tend to draw the piston downward; as the upper face of this same area is open to atmospheric pressure within the chamber 5. Such downward movement will be resisted by the spring 4 and the movement will open the annular port 8 forming connection between the chambers 5 and 6, allowing air to rush through from chamber 5 to chamber 6 and so on into the engine intake. Such flow of air if in excess of engine requirements, will cause the pressure within the chamber 5 to rise, until, acting on the annular area of the piston 1, together with the thrust of the spring 4, it will force the piston 1 up again, cutting down or closing the port 8. From this action it follows that for any given degree of compression of the spring 4, or for any given position of the spring footing 14, a certain definite pressure of air must exist within the chamber 6 and intake of the engine, providing the engine be in operation and drawing air from its intake.

The spring cap or footing 14 rests on a sliding frame 15, Figures 1 and 2, which sliding frame is free to reciprocate within guides 16', Fig. 2, formed on the inside of the box 9. The position of the sliding frame 15 is variable and controlled by the lever 16, the end of which bears against the under side of the sliding frame and which is mounted on and secured to the shaft 17 suitably held in bearings attached to the box 9. This shaft is manipulated by hand or other external means, and forms the means of varying the density of air supplied to the engine by the operator. It is now understood from the foregoing that for any given setting or position of this shaft or lever 16 by the operator, a certain pressure or density of air within the intake results, and movements of the sliding frame 15 are proportional to variations in the density of air supplied the engine. Having now described the means whereby the intake pressures are regulated, there remain the most essential features of my invention to be described, which constitute the means whereby movement of the hand operated lever 16 in addition to carrying out the functions already described, are properly translated into movements required to appropriately and simultaneously vary, according to the air densities used, the supply of fuel to the engine.

Referring to Figures 1 and 2, three pump plungers 18 are fitted to reciprocate in the pump cylinders 19 formed in a portion of the box 9. Against the lower end of each of these plungers 18 a spring 20 bears and tends to force the plunger up. The closed chamber beneath each of the plungers connects by the passage 21 with the intake valve 22 and the delivery valve 23, which are here indicated as ordinary ball valves. The suction pipes 24 and delivery pipes 25 connect with their respective valves. The upper ends of the pump plungers 18 are each pin connected to one end of a horizontal floating lever 26, the other end of which is pin connected to a rod 27 movable in the slotted guide 42, which rod in turn is pin connected at its lower end to a finger 28. This finger 28 is pivoted on a fixed pin 29 at one end, and rests on a cam 30. These cams, one for each pump plunger, can fittingly be mounted on the cam shaft of the engine, or they may be carried on any shaft suitably geared to the engine. Above each of the floating levers 26 is a fulcrum roller 31 mounted on a shaft 32. This shaft is held down by bearing rollers 33, one at each end of the shaft, which bear against the under side of a bearing plate 34 properly secured to the box 9. It will be seen that revolutions of the cams 30 acting through the fingers 28, rods 27, and levers 26, will cause reciprocating movements of the plungers 18, the levers 26 bearing against the fulcrum rollers 31. The springs 20 counteracting against the plungers 17, will likewise through these connections, cause the fingers 28 to be pressed against the cams 30.

It will readily be seen that the extent of the movements of the plungers 18 will be regulated by the position of the fulcrum rollers 31, and that if the fulcrum rollers be moved to positions directly above the plungers, no movement at all will be imparted to the plungers. So it is possible to communicate to the plungers all degrees of movement, from nothing up to a certain practical maximum, by varying the positions of the fulcrum rollers 31.

The shaft 32 carrying the fulcrum rollers is held in place by two links 35, the other ends of which engage with a pin 36 which passes through a guide roller 37. This pin 36 carrying the guide roller, also engages with the upper ends of the two links 38, the lower ends of which arms or links are pin connected to the lower portion of the sliding frame 15. The position of the sliding frame 15 therefore governs the vertical position of the guide roller 37. The guide roller 37 moves in a specially formed slot formed in the part 39. This part 39 is pivoted on the pin 40 at its upper end, and its angular position about this pin as center, is adjustable through the pinion 41 acting on the toothed segment at its lower end.

This part 39 as a whole I term an "adjustable profile" as this term is most comprehensively descriptive of it in any of the many forms in which it may be made. The function of this adjustable profile 39 is to properly translate or transform the movements of the frame 15, (which movements are directly proportional to variations in the density of the air drawn into the engine cylinders), to movements which properly vary the delivery of fuel by the pump plungers or other fuel supplying device. In making this translation or modification of movement, compensation must be properly made for: first, the manner in which the pump delivery is varied, in this case by the shifting of a fulcrum, and second, for the desired variation (if any) in the ratio of air to fuel. This transformation of movement therefore, involving as it does the following of a curve of varying ratios of air to fuel, as well as sometimes, (as in the form of apparatus illustrated) having to compensate for a varying degree of movement necessary for any given progressive variation in pump delivery, becomes an involved matter. These requirements become still more difficult through the necessity of providing for a possible variation of the curve of ratios of air to fuel which must be followed.

To accurately and properly fill these requirements, an apparatus capable of extreme freedom in its compensating capacity is demanded, and no mechanical device or arrangement seems to possess this needed universal flexibility of compensation to the extent, nor supply it in so simple a manner, as an adjustable profile or guide, or a formed profile of adjustable position. Along such a profile or guide, a roller or follower may be moved proportional to variations in the density of the air supplied to the engine cylinders, and movements resulting from the form of the profile be utilized to correspondingly vary, according to requirements hereinbefore set forth, the amount of fuel supplied.

Such is exactly the action of the apparatus herein described and shown in the drawings. The movements of the sliding frame 15 proportional to variations in the density of the air supplied the engine cylinder, are communicated to the roller 37 in one direction. This roller moves along the "adjustable profile" formed by the curved slot in the part 39, and the resulting movements of the roller laterally are transmitted with certain modification through the arms or links 35 to the fulcrum rollers 31 and so the delivery of the pump plungers is correspondingly varied according to the set requirements.

The apparatus as shown in Figure 1, with the adjustable profile 39 in the position there shown may be reasonably assumed to be adjusted to give ratios of air to fuel such as are indicated by the curve A in Figure 3. If now we readjust the position of the adjustable profile 39 by turning the pinion 41, so that the lower end of the adjustable profile or guide 39 is moved a small distance to the left, the pump plungers will be given longer strokes and will deliver more fuel for any degree of air density, and the resulting ratios of air to fuel will be thus indicated by the curve B in Figure 3. In the same way by readjusting the position of the profile or guide 39 still more to the left the curves C and D can be followed in the resulting ratios of air to fuel, or any one of an indefinite number of curves of general similarity can be followed by proper adjustment of the position of the profile 39.

By modifying the form or curvature of the slot in the part 39 which forms the profile, curves of air-fuel ratios of different form and characteristics will be followed by the apparatus, and by modifying the position of the pin 40 on which the adjustable profile is pivoted, a change will be introduced in the relative characteristics of the curves followed by different settings or adjustments of the profile.

Having now described the construction and action of the apparatus as shown in the drawings, I wish to call attention to the fact that many modifications of construction and arrangement may be introduced without affecting the action of the apparatus or the essentials of the invention. The adjustable profile 39 is not necessarily pivoted and adjusted angularly, but other provision may be made for holding it and adjusting its position. It will also be realized that the adjustable profile may be the part that is moved by the frame 15 and the roller or follower which bears against it may be held relatively stationary in line with such movement of the profile. In such an arrangement special means must be provided for holding the profile in its various adjustable positions while permitting movements imparted to it by the frame 15.

Another obvious modification would be to pivot the adjustable profile and allow to be imparted to it by the frame 15, an oscillating movement about its pivot and provide for adjusting the position of the pivot.

The manner of delivering the fuel to the engine cylinders does not essentially concern my invention. As herein described and shown, three pump plungers are used, and if desired the combined delivery of these three plungers may be supplied to a mixing device equivalent to an ordinary carbureter and the fuel so mixed with the air before entering the engine cylinders. Or the fuel may be injected directly into the cylinders at any desired period either before, during or after the compression stroke of the engine piston. A separate fuel plunger may be employed for each cylinder or all plungers may supply all cylinders. Such modifications are obvious and introduce no change in the essentials of the invention.

It is not essential that a plunger fuel pump be employed, as for example a pump formed by two intermeshing gears may be employed and its delivery be varied in quantity by modifying its rate of revolution, through frictional gearing or otherwise. The only essential as regards the form of fuel supplying device is that its quantity of delivery be subject to variation by movements derived from movement of the roller or follower along the adjustable profile.

I claim:

1. In combination, an intake connection, controlling means responsive to pressures in said connection for varying the density of the air therein, a fuel supplying device, a second means governing the delivery of the said fuel supplying device, means for establishing a connection between the controlling means and the said second means, and means for varying the connection in accordance with predetermined ratios.

2. In combination, an intake connection, governing means responsive to pressures in said connection for varying the density of the air therein, a fuel supplying device, means for controlling the delivery of the said fuel supplying device, a fulcrum, a third means associated with the fulcrum for varying the delivery of the said fuel supplying device, and means for establishing a connection between the governing means and the fulcrum.

3. In a fuel and air regulator for internal combustion engines, a piston acted on by the pressure of the air in the engine intake, a spring bearing on said piston, means for varying the pressure exerted by said spring, a fuel pump, means for varying the delivery of said pump, an adjustable profile, a follower guided by said profile, and suitable connections between said means for varying the pressure exerted by said spring and said means for varying the delivery of said pump, through said adjustable profile and said follower.

4. In a fuel and air regulator for internal combustion engines, a piston acted on by the pressure of the air in the engine intake, a spring bearing on said piston, means for varying the pressure exerted by said spring, a fuel pump, means for varying the delivery of said pump, a profile of adjustable position, a follower guided by said profile, a connection between said means for varying the pressure exerted by said spring and the said follower, and a connection between said follower and said means for varying the delivery of said pump.

5. In a fuel and air regulator for internal combustion engines, a piston acted on by the pressure of the air within the engine intake, a spring exerting a force against said piston, a movable part acting on said spring, a fuel pump, means for varying the delivery of said pump, an adjustable profile, a follower in contact with said profile, connecting means transforming movements of said movable part into relative movements between said profile and said follower, and connecting means transmitting certain components of said relative movements to said means for varying the delivery of said pump.

6. In a fuel and air regulator for internal combustion engines, means for varying the pressure of the air within the engine intake, a fuel pump, means for varying the delivery of said pump, a profile pivoted on and adjustable about a fixed point, a follower guided by said profile and deriving movement from said means for varying the pressure of the air within the engine intake, and a connection between said follower and said means for varying the delivery of said pump.

7. In a fuel and air regulator for internal combustion engines, a piston acted on by the pressure of the air within the engine intake, a spring acting on said piston, an adjustable part acting on said spring, a fuel pump, means for varying the delivery of said pump, a profile, a follower movable on said profile, connections transmitting movement from said movable part bearing on said spring to said means for varying the delivery of said pump, through relative movements between said profile and said follower.

8. In a control for internal combustion engines intake passages, resilient means responsive to pressures in the said intake passages for predetermining the suction in the intake passages, a fuel pump, means for varying the delivery of said pump, and a connection for correlating said suction determining means and said delivery varying means to secure simultaneous variation through any one of a plurality of predetermined sets of values, said connection including a profile associated with one means and a follower associated with the other means, and mechanism for readjusting the relationship between one means and the part associated therewith.

9. In combination, an intake connection, a first means responsive to pressures in said intake connection, manual control means associated with said first means for varying the density of the air in said connection, a fuel supplying device associated with the intake, means for governing the delivery of said fuel supplying device, and means for establishing a connection between the manual control means and the fuel supply governing means.

10. In combination, an intake connection, a first means responsive to pressures in said intake connection, manual control means associated with said first means for varying the density of the air in said connection, a fuel supplying device associated with the intake, means for governing the delivery of said fuel supplying device, means for establishing a connection between the manual control means and the fuel supply governing means, and means for varying the connection in accordance with predetermined ratios.

11. In combination, an intake connection, a first means responsive to pressures in said intake connection, manual control means associated with said first means for varying the density of the air in the said connection, a fuel supplying device, means for governing the delivery of the said fuel supplying device, a pivoted element provided with a slot, a roller riding in said slot and adapted to be actuated by the said manual control means, and means for establishing a connection between the roller and the said governing means.

12. In combination, an intake connection, a first means responsive to pressures in said connection comprising a piston and a spring bearing on the said piston, manual control means for varying the pressure exerted by the said spring to vary the density of the air in the said connection a fuel supplying device, means for governing the delivery of the said fuel supplying device, a pivoted element provided with a slot, a roller riding in said slot and adapted to be actuated by the said manual control means, and means for establishing a connection between the roller and the governing means.

In witness whereof, I hereunto subscribe my name this 23rd day of August, 1921.

GEORGE K. DAVOL.